(12) United States Patent
Lee

(10) Patent No.: US 6,349,492 B1
(45) Date of Patent: Feb. 26, 2002

(54) LIQUID ORNAMENT

(76) Inventor: Vincent K. Lee, 4F No. 48 Lane 10, Chi Furd, Taipei, 114 (TW)

( * ) Notice: Subject to any disclaimer, the term of this patent is extended or adjusted under 35 U.S.C. 154(b) by 0 days.

(21) Appl. No.: 09/589,765

(22) Filed: Jun. 9, 2000

(51) Int. Cl.⁷ ............................................. G09F 19/02
(52) U.S. Cl. ........................................ 40/426; 40/406
(58) Field of Search ........................ 40/406, 426, 411, 40/414; 446/267; 472/65; 267/140.14, 140.15

(56) References Cited

U.S. PATENT DOCUMENTS

| | | | | |
|---|---|---|---|---|
| 2,500,475 A | * | 3/1950 | Staaf ............................... | 46/45 |
| 3,071,375 A | * | 1/1963 | Moore ............................ | 272/8 |
| 3,239,956 A | * | 3/1966 | Canonica, Jr. ............ | 40/106.45 |
| 3,593,444 A | * | 7/1971 | Akrongold ................ | 40/106.21 |
| 3,613,264 A | * | 10/1971 | Vitka et al. ................ | 35/19 R |
| 4,490,931 A | * | 1/1985 | Fleemin ........................ | 40/406 |
| 4,578,044 A | * | 3/1986 | Saitoh ......................... | 446/134 |
| 4,693,455 A | * | 9/1987 | Andra ....................... | 267/140.1 |
| 4,852,283 A | * | 8/1989 | Teng ............................ | 40/426 |
| 5,146,701 A | * | 9/1992 | Lee ............................... | 40/406 |
| 5,189,821 A | * | 3/1993 | Lee ............................... | 40/406 |
| 5,252,101 A | * | 10/1993 | Rosenwinkel et al. ....... | 446/130 |
| 5,584,741 A | * | 12/1996 | Cheung ....................... | 446/300 |
| 5,706,595 A | * | 1/1998 | Lin ............................... | 40/406 |
| 5,924,691 A | * | 7/1999 | Meng-Suen .............. | 273/138.5 |
| 6,006,461 A | * | 12/1999 | Snyder ......................... | 40/426 |

* cited by examiner

*Primary Examiner*—Robert J Oberleitner
*Assistant Examiner*—Melody M. Burch
(74) *Attorney, Agent, or Firm*—Dougherty & Troxell

(57) ABSTRACT

A liquid ornament having means for creating continuous liquid flow is provided. The liquid ornament includes a display chamber for containing liquids, such as water and oil, and a control chamber for accommodating the means for creating liquid flow. The means for creating liquid flow mainly include an elastically flexible material that forms a partition between the display chamber and the control chamber, a push member having a free end contacting with the flexible material, a magnet attached to the free end of the push member, and a coil mounted within a magnetic field of the magnet. When the coil is continuously supplied with an electric current, it alternately magnetically repulses or attracts the magnet and accordingly causes the free end of the push member to intermittently push or strike the flexible material, producing continuous liquid flow in the display chamber when the whole liquid ornament is in a still state.

3 Claims, 7 Drawing Sheets

LIQUID ORNAMENT

BACKGROUND OF THE INVENTION

The present invention relates to a liquid ornament, and more particularly to a liquid ornament having means to create continuous liquid flow in a display chamber thereof while the liquid ornament is in a still state.

With rapid and wide developments in different industrial fields, the quality of people's life has been largely improved and people expect all kinds of products to be economical and practical for use. To satisfy the consumers, all manufacturers try to design products that not only have unique and attractive appearance and highly added value in addition to their intended functions, but also have compact volume to be easily positioned at any place without occupying too much room. Taking the liquid ornament as an example, it is an ornament designed to show dynamic and attractive scenes within a limited space. The liquid ornament must be leak-proof and the water and oil contained therein must not become mixed or turbid. Another important thing for the liquid ornament is it must be suitable for positioning at any desired place and can be easily packed within a space as small as possible. FIG. 1 illustrates a conventional wave-producing liquid ornament also designed by the inventor of the present invention. This type of liquid ornament includes a long and horizontally extended hollow liquid container (A) eccentrically supported on a short base (B) at a supporting point 5 provided near an end of the base (B). A cam (C) is provided near another end of the base (B) to externally push the liquid container (A) to swing about the supporting point 5, so that waves are produced in the liquid container (A).

Such conventional wave-producing liquid ornament has the following disadvantages:

1. The long liquid container (A) and the short base (B) together occupy large space and accordingly require higher packaging and conveying cost.
2. The conventional wave-producing liquid ornament is not adapted to mount on a wall.
3. The long hollow liquid container (A) tends to easily fall from the base (B) and become damaged when a person unexpectedly touches it.

It is therefore tried by the inventor to improve the conventional wave-producing liquid ornament so that waves can be produced in the liquid container (A) while the whole liquid ornament is in a still state, making the liquid ornament more convenient and practical for use.

SUMMARY OF THE INVENTION

A primary object of the present invention is to provide a liquid ornament having internally mounted means that enables creation of continuous liquid flow in a display chamber of the ornament without the need to swing the liquid ornament.

Another object of the present invention is to provide a liquid ornament that has an integral and compact shell occupying reduced space and facilitating easy packaging and conveyance thereof.

A further object of the present invention is to provide a liquid ornament that can be hung on a wall without the risk of being unexpectedly touched and damaged.

A still further object of the present invention is to provide a liquid ornament that is allowed to have more changes in its appearance design.

To achieve the above and other objects, the liquid ornament according to the present invention has a hollow shell divided into a display chamber for containing one or more types of liquids and a control chamber in which means for creating continuous liquid flow in the display chamber are mounted. The means for creating continuous liquid flow in the liquid ornament mainly include an elastically flexible material that forms a partition between the display chamber and the control chamber of the liquid ornament, a push member having a free end contacting with the flexible material, a magnet attached to the free end of the push member, and a coil mounted within a magnetic field of the magnet. When the coil is continuously supplied with an electric current, it alternately magnetically repulses or attracts the magnet and accordingly causes the free end of the push member to intermittently strike the flexible material, producing constant liquid flow in the display chamber without the need of swinging the display chamber.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
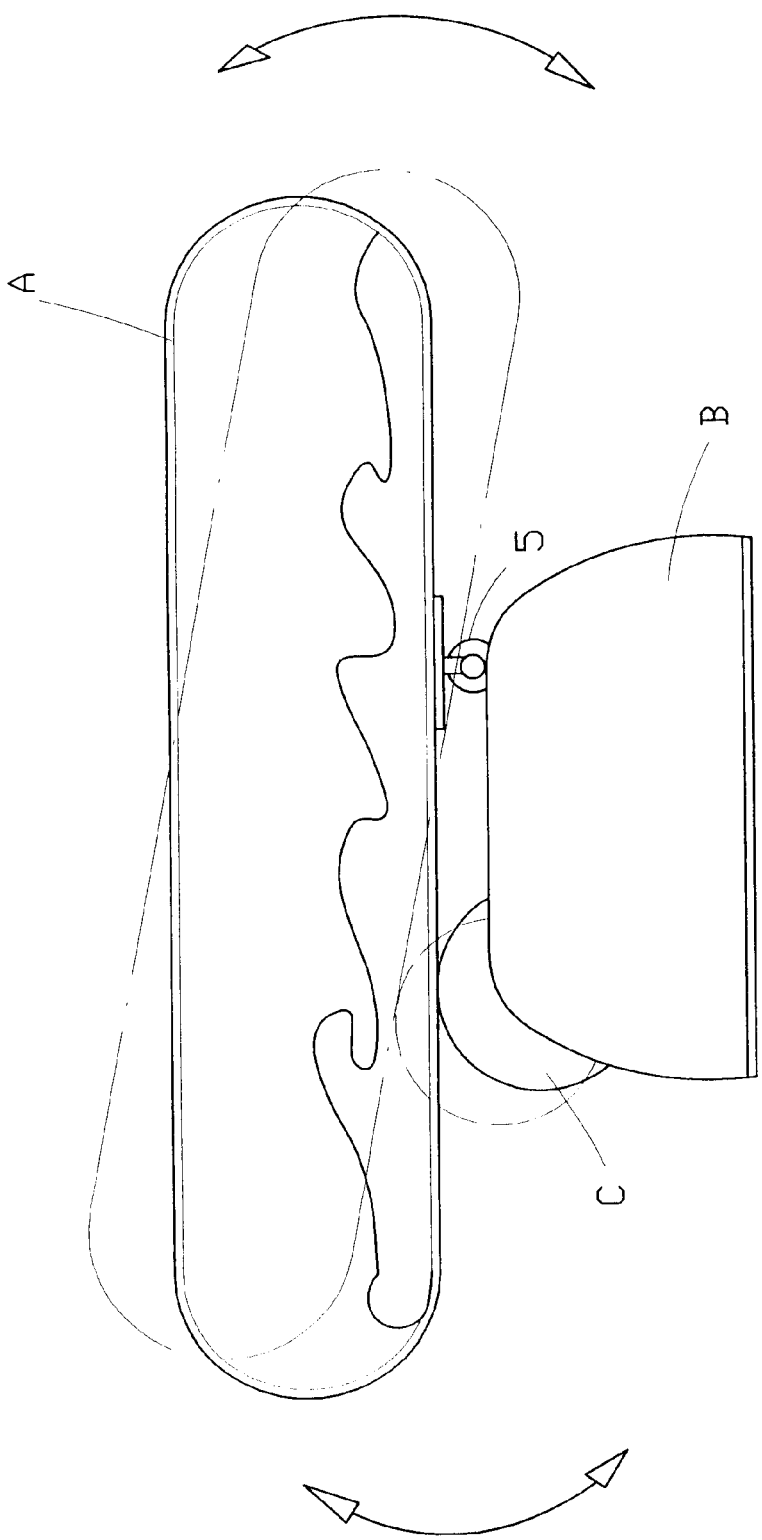
FIG. 1 is an elevational plan view a conventional wave-producing liquid ornament showing the movements thereof.
Figure 2:
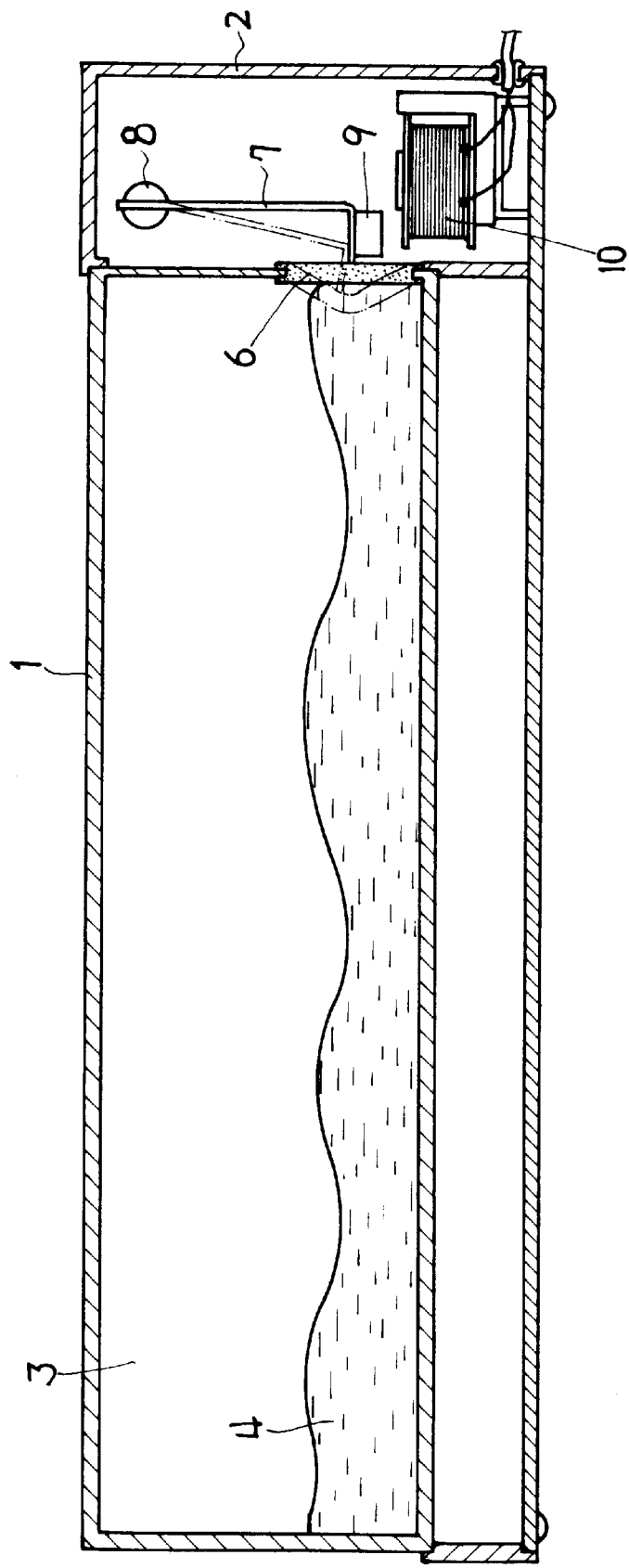
FIG. 2 is a sectional view of an improved wave-producing liquid ornament according to an embodiment of the present invention.
Figure 3:
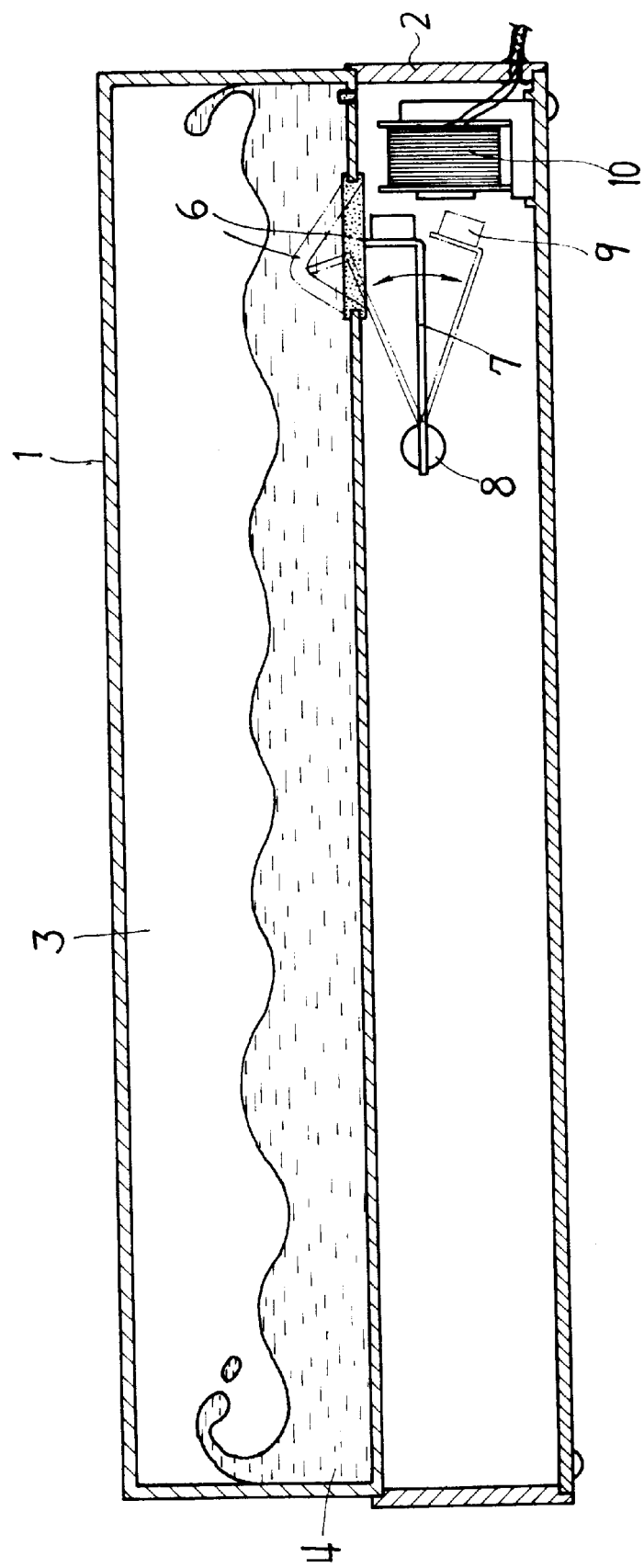
FIG. 3 is a sectional view of another improved wave-producing liquid ornament according to another embodiment of the present invention.

Please refer to FIGS. 2 and 3 that are sectional views of two wave-producing liquid ornaments according to a first and a second embodiment of the present invention, respectively. As shown, both these liquid ornaments include a hollow shell that is divided into at least one larger display chamber 1 and one smaller control chamber 2. The display chamber 1 is filled with two different types of liquids, namely, a specific type of oil 3 and water 4. The control chamber 2 maybe located at different position in the hollow shell of the liquid ornament. In FIG. 2, the control chamber 2 is located at one lateral side of the display chamber 1. And, in FIG. 3, the control chamber 2 is located at a lower side of the display chamber 1.

In the control chamber 2, there are means for creating continuous liquid flow in the display chamber 1 of the liquid ornament. These means mainly include a push member 7, a coil 10, and an elastically flexible material 6 that forms a portion of a partition between the display chamber 1 and the control chamber 2 and is preferably located close to a lower part of the display chamber 1 having the water 4 contained therein.

The push member 7 has a first end pivotally connected to a wall of the control chamber 2 to serve as a supporting point 8, and a second end turning toward the flexible material 6 on the partition between the control chamber 2 and the display chamber 1. The second end of the push member 7 may be fixedly connected to the flexible material 6 or simply closely contacting with the flexible material 6. A magnet 9 is attached to the second end of the push member 7. The coil 10 is fixedly mounted in the control chamber 2 at a position that is within a magnetic field of the magnet 9 and has positive and negative electrodes. Under the effects of magnetic induction and magnetic repulsion and attraction, the coil 10, when being supplied with an electric current, would alternately magnetically repulse or attract the magnet 9, causing the push member 7 to swing about its supporting point 8 and therefore brings the second end having the magnet 9 fixed thereto to reciprocatingly move toward or away from the flexible material 6 on the partition between the display chamber 1 and the control chamber 2.

Each time the second end of the push member 7 is moved toward the flexible material 6, it pushes, in the case the second end of the push member 7 is fixedly connected to the flexible material 6, or strikes, in the case the second end of the push member 7 is closely contacting with the flexible material 6, the flexible material 6 for the same to move forward into the display chamber 1 to compress an inner space of the display chamber 1. And when the second end of the push member 7 is moved away from the flexible material 6, the display chamber 1 returns to its normal inner space. When the coil 10 is continuously supplied with electric current to swing the push member 7, the inner space of the display chamber 1 is intermittently compressed to produces waves in the water 4 in the display chamber 1.

To create more and stronger waves in the display chamber 1, suitable means, such as one or more baffles (not shown), may be further mounted in the display chamber 1 at predetermined positions to properly check liquid flows produced by the second end of the push member 7 pushing or striking the flexible material 6.

The liquid ornament employing the means for creating continuous liquid flow according to the present invention is not necessarily limited to the wave-producing liquid ornaments shown in FIGS. 2 and 3. Other differently contoured and functioning liquid ornaments may also employ the above-described means to create continuous liquid flow.

Figure 4:
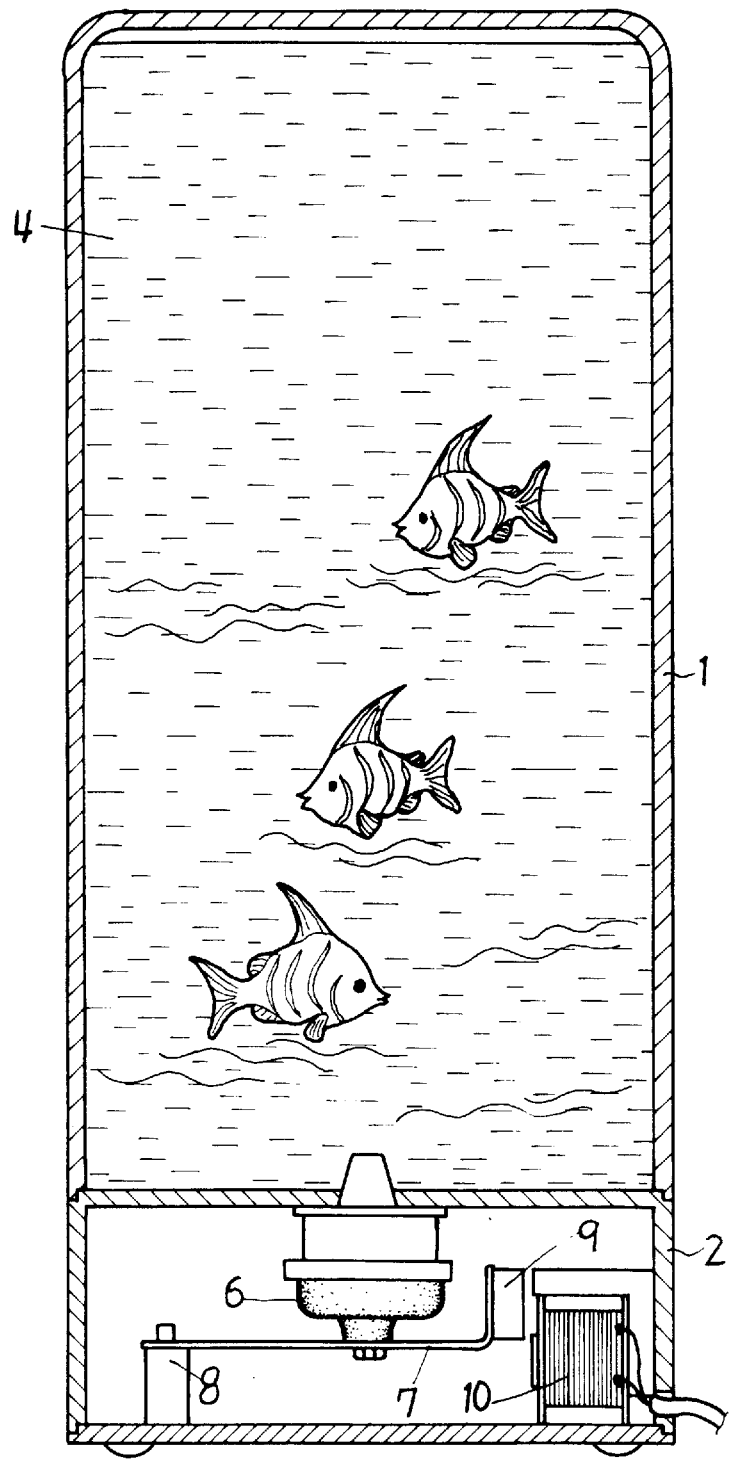
FIG. 4 is a sectional view of a mono-liquid ornament according to a third embodiment of the present invention.

FIG. 4 illustrates a mono-liquid ornament according to a third embodiment of the present invention having means for creating continuous liquid flow. However, in this third embodiment, the means for creating continuous liquid flow has an elastically flexible material 6 that does not directly form a portion of the partition between the display chamber 1 and the control chamber 2. Instead, the elastically flexible material 6 forms one compressive end of an air pump to contact with or connect to the push member 7 while another outlet end of the air pump extends through the partition into the display chamber 1.

Figure 5:
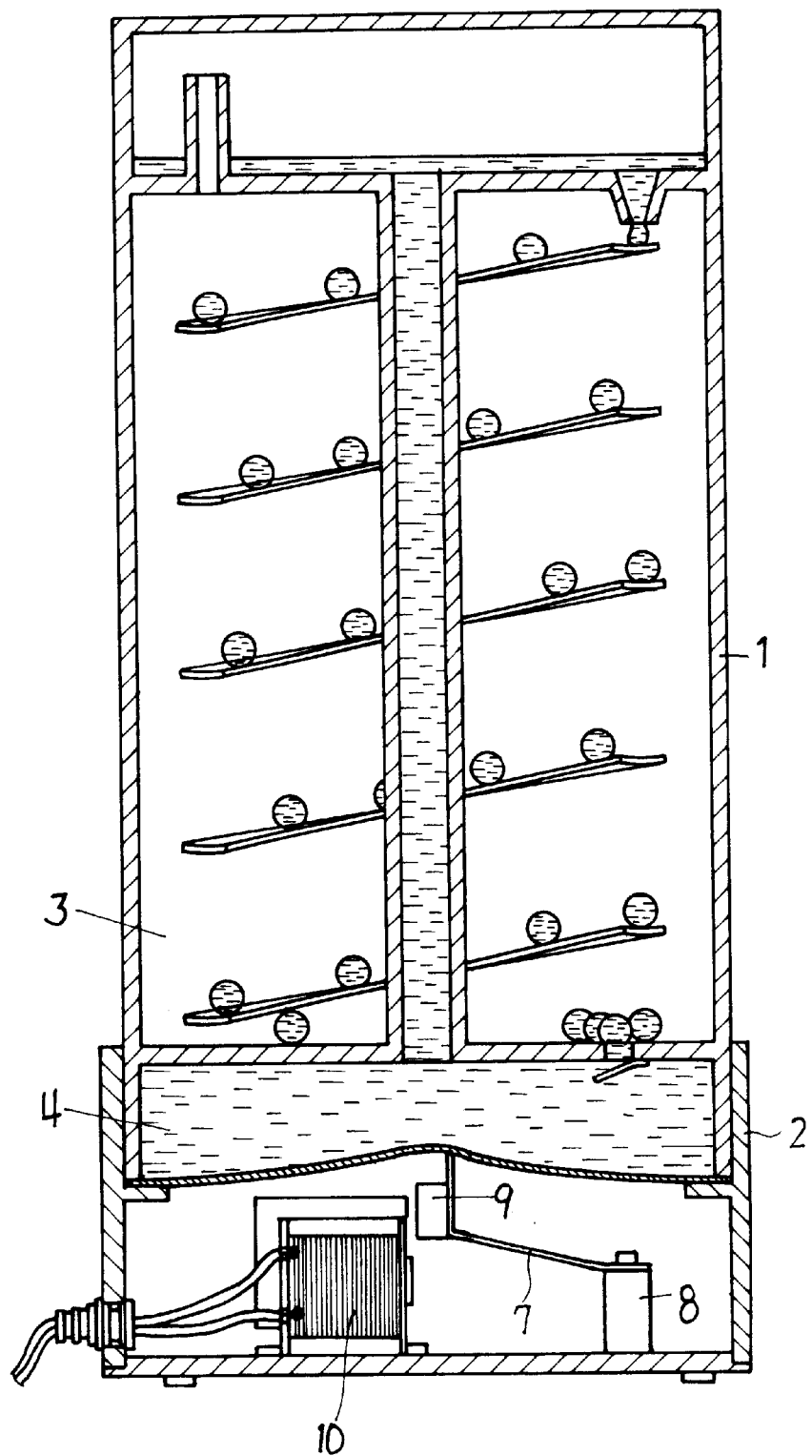
FIG. 5 is a sectional view of a dual-liquid ornament according to a fourth embodiment of the present invention.
Figure 6:
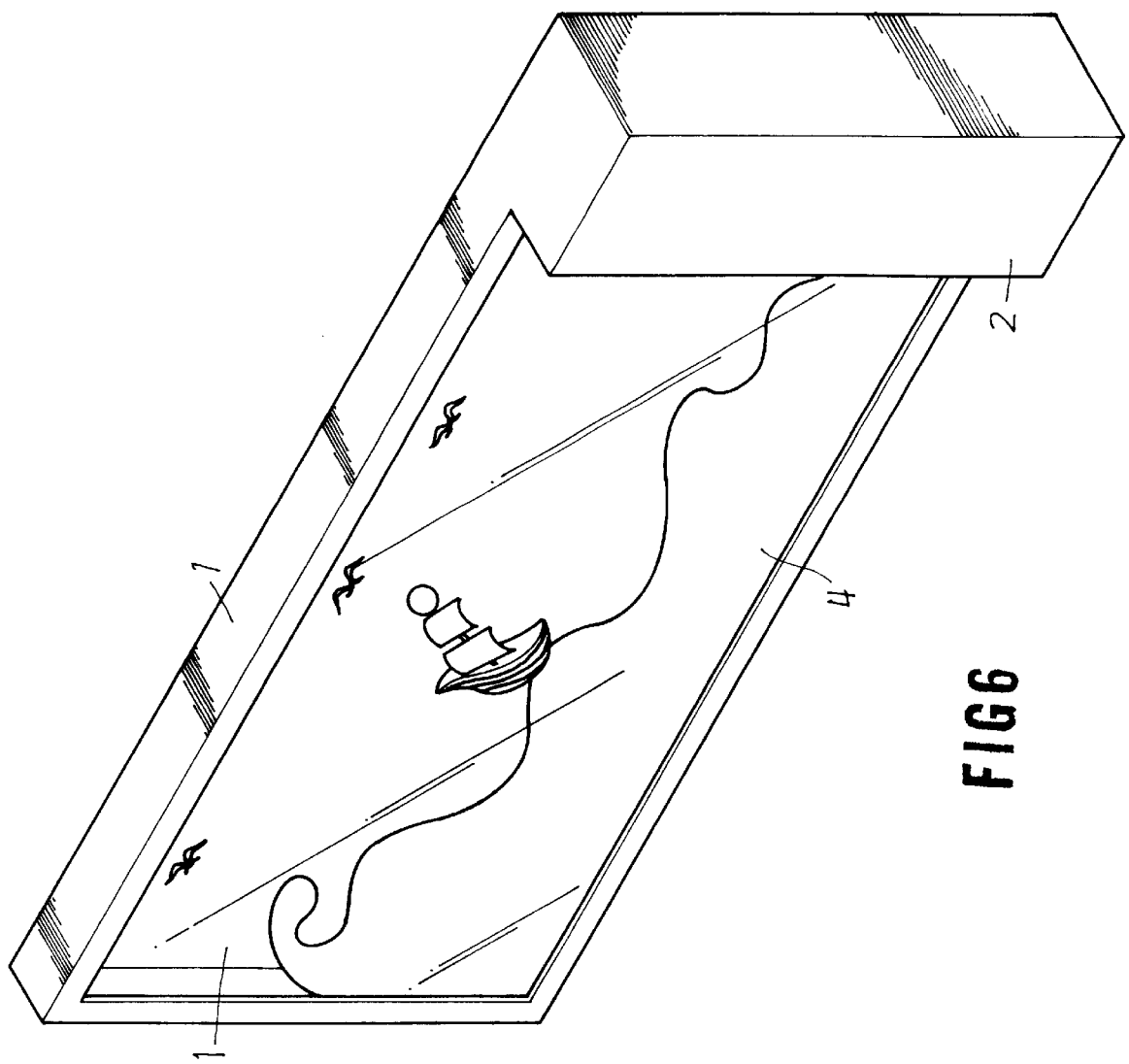
FIG. 6 shows an improved wave-producing ornament according to the present invention having a flat contour adapted to be mounted on a wall.
Figure 7:
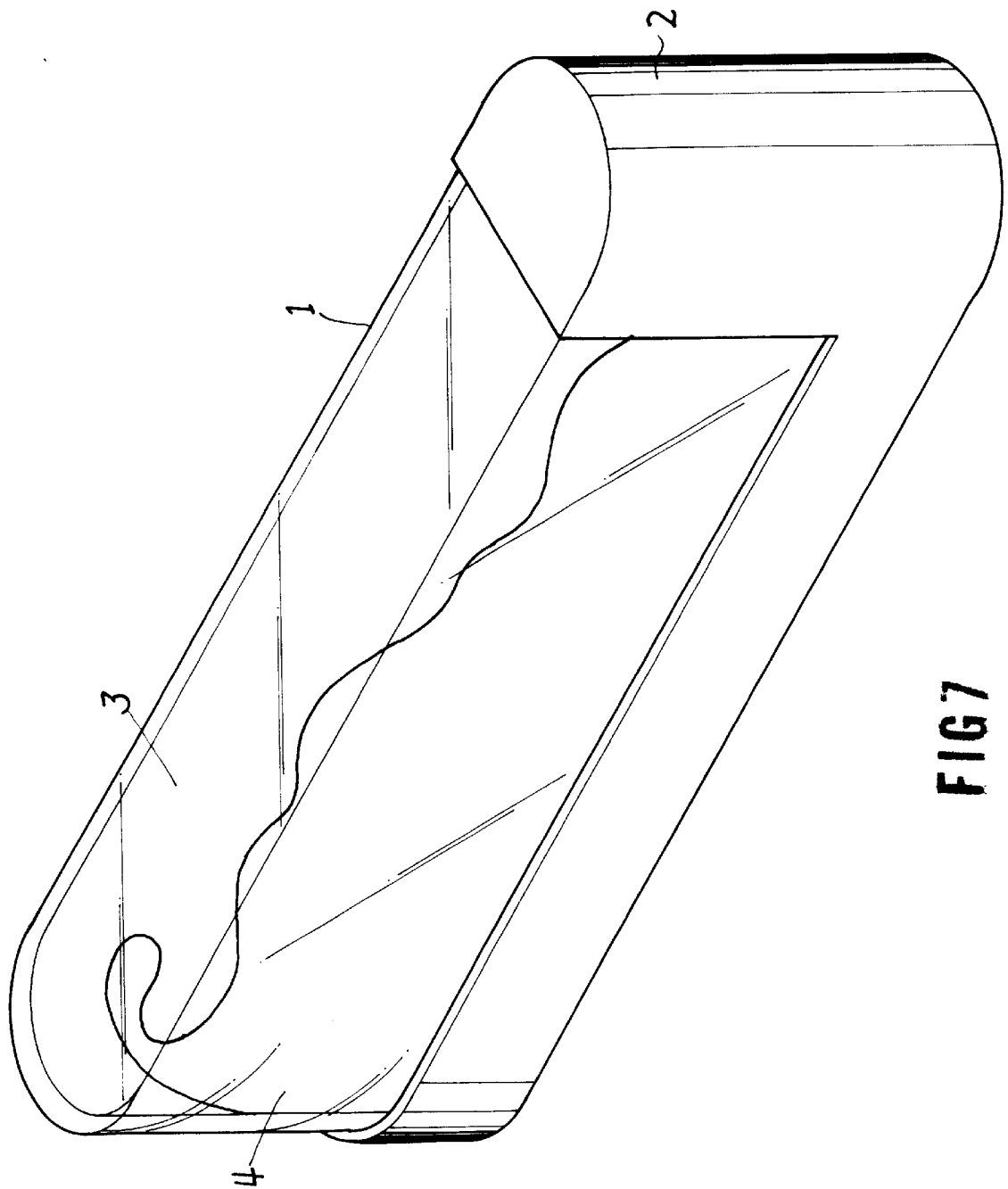
FIG. 7 shows another improved wave-producing ornament according to the present invention having a contour suitable for positioning on a desktop.

FIG. 5 illustrates a dual-liquid ornament according to a fourth embodiment of the present invention having means for creating continuous liquid flow. In this fourth embodiment, the means for creating continuous liquid flow has an elastically flexible material 6 that does not directly form a portion of the partition between the display chamber 1 and the control chamber 2. Instead, the elastically flexible material 6 forms an elastic diaphragm between the control chamber 2 and a water chamber communicably provided below the display chamber 1. It is understood that the means for creating continuous liquid flow according to the present invention may still have many other designs in their arrangements depending on the appearances of liquid ornaments with which the means of the present invention are used. For example, the means for creating continuous liquid flow may be used with a liquid ornament having two overlapped or superposed display chambers, a wave-producing liquid ornament having a flat-contoured display chamber adapted to mount on a wall without occupying additional space, as shown in FIG. 6, or a wave-producing liquid ornament having a wide base suitable for positioning on a desktop or any other suitable place, as shown in FIG. 7.

What is claimed is:

1. A liquid ornament having means for creating continuous liquid flow, said liquid ornament comprising a display chamber in which one or two types of liquids are contained, and a control chamber in which said means for creating continuous liquid flow are located; said means for creating continuous liquid flow comprising an elastically flexible material that forms a partition between said display chamber and said control chamber, a push member having a free end contacting with said flexible material, a magnet attached to said free end of said push member, and a coil having positive and negative electrodes and being fixedly mounted at a location within a magnetic field of said magnet; whereby when an electric current is continuously supplied to said coil, said coil alternately magnetically repulses or attracts said magnet and accordingly causes said free end of said push member having said magnet attached thereto to intermittently push or strike said flexible material, producing changes in an inner space of said display chamber and accordingly producing continuous liquid flow in said display chamber.

2. A liquid ornament having means for creating continuous liquid flow as claimed in claim 1, wherein said control chamber is capable of being located to any side of said display chamber, depending on a contour of said display chamber.

3. A liquid ornament having means for creating continuous liquid flow as claimed in claim 1, wherein said push member has an end opposite to said free end being pivotally fixed to a wall of said control chamber to serve as a supporting point, such that when said coil magnetically repulses said magnet, said push member pivotally swings about said supporting point in order for said free end of said push member to push or strike said flexible material.

* * * * *